United States Patent
Sung et al.

(10) Patent No.: US 11,235,758 B2
(45) Date of Patent: Feb. 1, 2022

(54) VEHICLE AND METHOD OF CONTROLLING THEREOF

(71) Applicants: HYUNDAI MOTOR COMPANY, Seoul (KR); KIA MOTORS CORPORATION, Seoul (KR)

(72) Inventors: Dong Hyun Sung, Hwaseong-si (KR); Dae Seok Jeon, Hwaseong-si (KR); Junghyun Kim, Seoul (KR); Sangmin Lee, Seoul (KR); NamGyun Kim, Incheon (KR); Jong Chul Kim, Suwon-si (KR); Yongseok Kwon, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 334 days.

(21) Appl. No.: 16/654,669

(22) Filed: Oct. 16, 2019

(65) Prior Publication Data

US 2020/0377079 A1    Dec. 3, 2020

(30) Foreign Application Priority Data

May 27, 2019    (KR) .......................... 10-2019-0061712

(51) Int. Cl.
*B60W 30/09*    (2012.01)
*B60W 10/18*    (2012.01)
*B60W 10/20*    (2006.01)

(52) U.S. Cl.
CPC ............ *B60W 30/09* (2013.01); *B60W 10/18* (2013.01); *B60W 10/20* (2013.01); *B60W 2554/00* (2020.02); *B60W 2710/18* (2013.01); *B60W 2710/20* (2013.01)

(58) Field of Classification Search
CPC ...... B60W 30/09; B60W 10/18; B60W 10/20; B60W 2554/00; B60W 2710/18; B60W 2710/20
USPC ............................................................ 701/70
See application file for complete search history.

(56) References Cited

U.S. PATENT DOCUMENTS

| | | | | |
|---|---|---|---|---|
| 9,047,778 | B1* | 6/2015 | Cazanas | G08G 1/166 |
| 10,685,575 | B1* | 6/2020 | Pareek | G06T 7/70 |
| 10,762,786 | B1* | 9/2020 | Dewey | G08G 1/04 |
| 11,110,795 | B2* | 9/2021 | Mizuno | B60K 31/0008 |
| 11,125,873 | B1* | 9/2021 | Robertson | G01S 7/411 |
| 2017/0341641 | A1* | 11/2017 | Miller | G08G 1/164 |

(Continued)

FOREIGN PATENT DOCUMENTS

| | | | | |
|---|---|---|---|---|
| CN | 103761889 A | * | 4/2014 | |
| CN | 107710303 A | * | 2/2018 | ............... B62D 6/00 |

(Continued)

OTHER PUBLICATIONS

Ajinkya et al., "Collision Detection and Avoidance using Extrapolation," 2017, Publisher: IEEE.*

(Continued)

*Primary Examiner* — Tuan C To
(74) *Attorney, Agent, or Firm* — Slater Matsil, LLP

(57) ABSTRACT

The present disclosure relates to a vehicle and a method of controlling the same, and more particularly, to a technique of increasing a reliability of a collision avoidance control system by performing a vehicle front collision determination and a vehicle side collision determination by different controllers.

20 Claims, 7 Drawing Sheets

(56) References Cited

U.S. PATENT DOCUMENTS

| | | | |
|---|---|---|---|
| 2018/0178783 A1* | 6/2018 | Saiki | G08G 1/166 |
| 2019/0179339 A1* | 6/2019 | Kim | B60W 30/18163 |
| 2019/0329762 A1* | 10/2019 | Kwon | B60T 8/17558 |
| 2020/0086854 A1* | 3/2020 | Liu | B60W 30/09 |
| 2020/0086855 A1* | 3/2020 | Packer | B60W 30/09 |
| 2020/0294401 A1* | 9/2020 | Kerecsen | G05D 1/0287 |
| 2021/0100156 A1* | 4/2021 | Iwase | G01S 7/5205 |

FOREIGN PATENT DOCUMENTS

| | | | | |
|---|---|---|---|---|
| KR | 20140118750 A * | 10/2014 | | G08G 1/166 |
| KR | 10-2018-0065585 A | 6/2018 | | |
| KR | 10-2018-0066524 A | 6/2018 | | |
| WO | WO-2017116073 A1 * | 7/2017 | | B60W 50/14 |

OTHER PUBLICATIONS

M. Adeel et al., "Adjacent Vehicle Collision Avoidance Protocol in Mitigating the Probability of Adjacent Vehicle Collision," 2012, Publisher: IEEE.*

Fujun et al., "Improvement on Obstacle Avoiding Ability based on Laser Range Finder," 2010, Publisher: IEEE.*

Hidehisa et al., "Target Following Brake Control for Collision Avoidance Assist of Active Interface Vehicle," 2006, Publisher: IEEE.*

* cited by examiner

FIG. 6

| DIVISION | CHECK RESULT FLAG OF INTEGRATED DANGERED SITUATION | FIRST CONTROLLER (DETERMINATION RESULT OF POSSIBILITY OF COLLISION IN AVOIDANCE IN FORWARD DETECTION AREA) | | | | SECOND CONTROLLER (DETERMINATION RESULT OF POSSIBILITY OF COLLISION IN AVOIDANCE IN SIDE DETECTION AREA) | | |
|---|---|---|---|---|---|---|---|---|
| | | FLAG | PRESENCE OF TARGET VEHICLE | AVAILABILITY OF AVOIDANCE TO LEFT-SIDE OF TARGET VEHICLE | AVAILABILITY OF AVOIDANCE TO RIGHT-SIDE OF TARGET VEHICLE | FLAG | AVAILABILITY OF AVOIDANCE TO LEFT-SIDE OF TARGET VEHICLE | AVAILABILITY OF AVOIDANCE TO RIGHT-SIDE OF TARGET VEHICLE |
| FIRST CONTROLLER + SECOND CONTROLLER | 0 | 0 | X | | | 1 | - | - |
| | 0 | 1 | O | O | O | 2 | - | - |
| | 0 | 1 | O | O | O | 3 | - | - |
| | 0 | 1 | O | O | O | 4 | - | - |
| | 1 | 2 | O | X | O | 1 | O | O |
| | 0 | 2 | O | X | O | 2 | X | O |
| | 0 | 2 | O | X | O | 3 | O | X |
| | 1 | 2 | O | X | O | 4 | X | X |
| | 1 | 3 | O | O | X | 1 | O | O |
| | 0 | 3 | O | O | X | 2 | X | O |
| | 1 | 3 | O | O | X | 3 | O | X |
| | 1 | 3 | O | O | X | 4 | X | X |
| | 1 | 4 | O | X | X | 1 | O | O |
| | 1 | 4 | O | X | X | 2 | X | O |
| | 1 | 4 | O | X | X | 3 | O | X |
| | 1 | 4 | O | X | X | 4 | X | X | and a side detection sensor fail or an error occurs in

VEHICLE AND METHOD OF CONTROLLING THEREOF

CROSS-REFERENCE TO RELATED APPLICATION

This application claims priority to and the benefit of Korean Patent Application No. 10-2019-0061712, filed on May 27, 2019, which is incorporated herein by reference in its entirety.

FIELD

Forms of the present disclosure relate to a vehicle and a method controlling thereof performs, specifically a technique of increasing a reliability of a collision avoidance control system by performing a vehicle front collision determination and a vehicle side collision determination by different controllers

BACKGROUND

The statements in this section merely provide background information related to the present disclosure and may not constitute prior art.

The vehicle means a device capable of carrying a person or object to a destination while driving on a road or a track. The vehicle can be moved to various positions, mainly using one or more wheels installed on the vehicle body. Such a vehicle may be a three-wheeled or four-wheeled vehicle, a two-wheeled vehicle such as a motorcycle, a construction machine, a bicycle, and a train traveling on a rail disposed on a track.

In modern society, cars are the most common means of transportation, and the number of people using them is increasing. Due to the development of automobile technology, it is easy to move long distances and make life easier. However, in a high-density population such as Korea, road traffic conditions worsen and traffic congestion often occurs.

Recently, in order to reduce the burden on the driver and to increase the convenience, research on vehicles equipped with an Advanced Driver Assist System (ADAS), which actively provides information on vehicle status, driver status, and surrounding environment, is being actively conducted.

Examples of advanced driver assistance systems in vehicles include the Forward Collision Avoidance (FCA), and Autonomous Emergency Brake (AEB). Such a system is a collision avoidance system that determines the risk of collision with an opposing vehicle or a crossing vehicle in a driving situation of a vehicle, and uses emergency braking in a collision situation.

Conventionally, the vehicle front detection result and the vehicle side detection result are processed by one controller to perform the collision avoidance control of the vehicle. As a result, some of the forward detection sensor and the side detection sensor fail or an error occurs in the processing result of one controller. In this case, problems with accurate collision avoidance control could occur.

Therefore, the necessity to improve the reliability of the collision avoidance control system by processing data processing for performing collision avoidance control of the vehicle by a plurality of controllers is desired.

The above information disclosed in this Background section is only for enhancement of understanding of the background of the present disclosure, and therefore it may contain information that does not form the prior art that is already known to a person of ordinary skill in the art.

SUMMARY

The present disclosure provides an improvement to the reliability of the collision avoidance control system of a vehicle by performing a vehicle front collision determination and a vehicle side collision determination, respectively, by different controllers.

In accordance with an aspect of the present disclosure, a vehicle includes a forward detection sensor configured to detect at least one of a target vehicle in front of the vehicle and other object; a side detection sensor 201 configured to detect an object located at least one of a left-side or right-side of the vehicle; a first controller configured to determine a possibility of forward avoidance of the vehicle with respect to the target vehicle; a second controller configured to determine a possibility of side avoidance of the vehicle with respect to the target vehicle; a third controller configured to determine possibility of avoiding driving of the vehicle with respect to the target vehicle based on a result of detecting the target vehicle and the other object of the forward detection sensor and a result of detecting the object of the side detection sensor; an integrated controller configured to determine a final avoidance possibility for the target vehicle based on the possibility of forward avoidance determined by the first controller and the possibility of side avoidance determined by the second controller, and adjust a control amount of collision avoidance of the vehicle by comparing the possibility of avoiding driving determined by the third controller with the determined final avoidance possibility.

Further, the first controller may determine a left-side avoidance area and right-side avoidance area with respect to the detected target vehicle, and determine the possibility of forward avoidance of the vehicle with respect to the target vehicle based on the determined avoidance area.

Further the first controller may determine avoidance path for the vehicle to avoid in the left-side avoidance area or the right-side avoidance area, and determine whether an object is located in the left-side avoidance area of the target vehicle based on a result of forward detecting of the forward detection sensor, and determines that the possibility of forward avoidance is that the vehicle avoids the target vehicle through the determined left avoidance path when the object is not located in the left-side avoidance area.

Further, the first controller may determine avoidance path for the vehicle to avoid in the left-side avoidance area or the right-side avoidance area, and determine whether an object is located in the right-side avoidance area of the target vehicle based on a result of forward detecting of the forward detection sensor, and determines that the possibility of forward avoidance is that the vehicle avoids the target vehicle through the determined right avoidance path when the object is not located in the right-side avoidance area.

Further, the first controller may determine whether the object is located in the right-side avoidance area and the left-side avoidance area of the target vehicle based on a result of forward detecting of the forward detection sensor, and determine that the possibility of forward avoidance is that the vehicle cannot avoid the target vehicle if the object is located in the right-side avoidance area and the left-side avoidance area.

Further, the second controller may determine a lane change path for the vehicle to avoid the target vehicle based on the detected object, and determines the possibility of side avoidance of the vehicle with respect to the target vehicle based on the determined lane change path.

Further, the second controller may determine whether the object is located in the left-side of the vehicle based on a result of side detecting of the side detection sensor, and determine the possibility of side avoidance to avoid the target vehicle through the determined left lane change path when the object is not located in the left-side of the vehicle.

Further, the second controller may determine whether the object is located in the right-side of the vehicle based on a result of side detecting of the side detection sensor, and determine the possibility of side avoidance to avoid the target vehicle through the determined right lane change path when the object is not located in the right-side of the vehicle.

Further, the second controller may determine whether the object is located in the right-side and left-side of the vehicle based on a result of side detecting of the side detection sensor, and determine that the possibility of side avoidance is that the vehicle cannot avoid the target vehicle when the object is located in the right-side and the left-side of the vehicle.

Further, the integrated controller may increase a braking amount of the vehicle to be greater than a predetermined value if the final avoidance possibility determined from the first controller and the second controller is matched to the possibility of avoiding driving determined by the third controller, and the integrated controller may decrease a braking amount of the vehicle to be less than the predetermined value if the final avoidance possibility determined from the first controller and the second controller is not matched to the possibility of avoiding driving determined by the third controller.

Further, the integrated controller may advance a braking time point of the vehicle to be earlier than a predetermined time point if the final avoidance possibility determined from the first controller and the second controller is matched to the possibility of avoiding driving determined by the third controller, and the integrated controller may delay the braking time point of the vehicle to be later than the predetermined time point if the final avoidance possibility determined from the first controller and the second controller is not matched to the possibility of avoiding driving determined by the third controller.

Further, the integrated controller may advance a collision warning time point of the vehicle to be earlier than a predetermined time point if the final avoidance possibility determined from the first controller and the second controller is matched to the possibility of avoiding driving determined by the third controller, and the integrated controller may delay the collision warning time point of the vehicle to be later than the predetermined time point if the final avoidance possibility determined from the first controller and the second controller is not matched to the possibility of avoiding driving determined by the third controller.

In accordance with an aspect of the present disclosure, a method for controlling a vehicle including a first controller, second controller, and a third controller includes detecting at least one of a target vehicle in front of the vehicle and other object; detecting an object located at least one of a left-side or right-side of the vehicle; determining a possibility of forward avoidance of the vehicle with respect to the target vehicle by the first controller; determining a possibility of side avoidance of the vehicle with respect to the target vehicle by the second controller; determining possibility of avoiding driving of the vehicle with respect to the target vehicle based on a result of detecting the target vehicle and the other object and a result of detecting the object by the third controller; and determining a final avoidance possibility for the target vehicle based on the possibility of forward avoidance determined by the first controller and the possibility of side avoidance determined by the second controller, and adjusting a control amount of collision avoidance of the vehicle by comparing the possibility of avoiding driving determined by the third controller with the determined final avoidance possibility.

Further, determining the possibility of forward avoidance of the vehicle may comprise determining a left-side avoidance area and a right-side avoidance area with respect to the detected target vehicle, and determining the possibility of forward avoidance of the vehicle with respect to the target vehicle based on the determined avoidance area by the first controller.

Further, the method may further include determining avoidance path for the vehicle to avoid in the determined left-side avoidance area or the right-side avoidance area, and determining the possibility of forward avoidance of the vehicle may comprise determining whether an object is located in the left-side avoidance area of the target vehicle based on a result of forward detecting, and determining the possibility of forward avoidance as avoiding the target vehicle through the determined left avoidance path when the object is not located in the left-side avoidance area.

Further, the method may further include determining avoidance path for the vehicle to avoid in the determined left-side avoidance area or the right-side avoidance area, and determining the possibility of forward avoidance of the vehicle may comprise determining whether an object is located in the right-side avoidance area of the target vehicle based on a result of forward detecting, and determining the possibility of forward avoidance as avoiding the target vehicle through the determined right avoidance path when the object is not located in the right-side avoidance area, and determining whether the object is located in the right-side avoidance area and the left-side avoidance area of the target vehicle based on a result of forward detecting, and determining that the possibility of forward avoidance is that the vehicle cannot avoid the target vehicle if the object is located in the right-side avoidance area and the left-side avoidance area.

Further, determining the possibility of side avoidance of the vehicle may comprise determining a lane change path for the vehicle to avoid the target vehicle based on the detected object, and determining the possibility of side avoidance of the vehicle with respect to the target vehicle based on the determined lane change path by the second controller, determining whether the object is located in the left-side of the vehicle based on a result of side detecting of the side detection sensor, and determining the possibility of side avoidance to avoid the target vehicle through the determined left lane change path when the object is not located in the left-side of the vehicle, determining whether the object is located in the right-side of the vehicle based on a result of side detecting of the side detection sensor, and determining the possibility of side avoidance to avoid the target vehicle through the determined right lane change path when the object is not located in the right-side of the vehicle, and determining whether the object is located in the right-side and left-side of the vehicle based on a result of side detecting of the side detection sensor 201, and determining that the possibility of side avoidance is that the vehicle cannot avoid the target vehicle when the object is located in the right-side and the left-side of the vehicle.

Further, the method may further comprise increasing a braking amount of the vehicle to be greater than a predetermined value if the final avoidance possibility determined from the first controller and the second controller is matched to the possibility of avoiding driving determined by the third controller, and decreasing a braking amount of the vehicle to be less than the predetermined value if the final avoidance possibility determined from the first controller and the second controller is not matched to the possibility of avoiding driving determined by the third controller.

Further, the method may further comprise advancing a braking time point of the vehicle to be earlier than a predetermined time point if the final avoidance possibility determined from the first controller and the second controller is matched to the possibility of avoiding driving determined by the third controller, and delaying the braking time point of the vehicle to be later than the predetermined time point if the final avoidance possibility determined from the first controller and the second controller is not matched to the possibility of avoiding driving determined by the third controller.

Further, the method may further comprise advancing a collision warning time point of the vehicle to be earlier than a predetermined time point if the final avoidance possibility determined from the first controller and the second controller is matched to the possibility of avoiding driving determined by the third controller, and delaying the collision warning time point of the vehicle to be later than the predetermined time point if the final avoidance possibility determined from the first controller and the second controller is not matched to the possibility of avoiding driving determined by the third controller.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

These and/or other aspects of the present disclosure will become apparent and more readily appreciated from the following description of the forms, taken in conjunction with the accompanying drawings of which:

FIG. 6 is a diagram illustrating a method for determining collision avoidance control of a vehicle according to a form.

Figure 1:
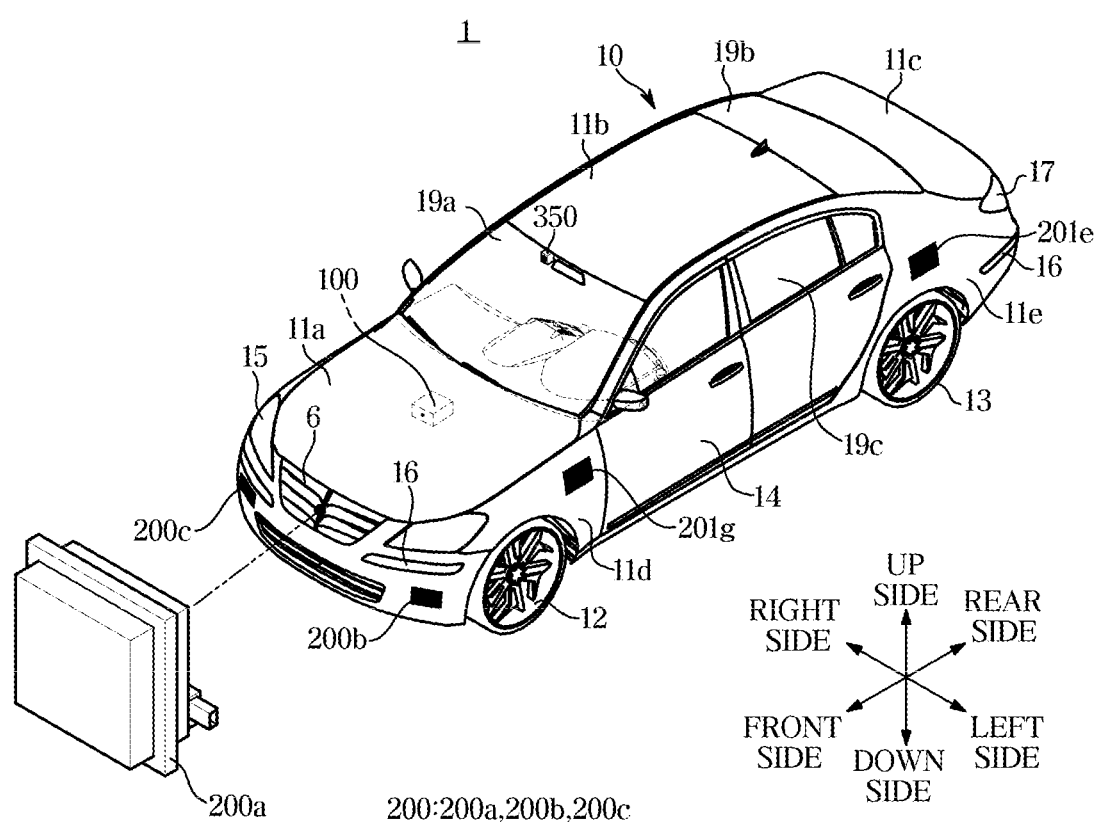
FIG. 1 is a perspective view schematically illustrating an exterior of a vehicle according to one aspect.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, forms of the present disclosure will be described with reference to the accompanying drawings.

FIG. 1 is a perspective view schematically illustrating an exterior of a vehicle according to a form.

Figure 2:
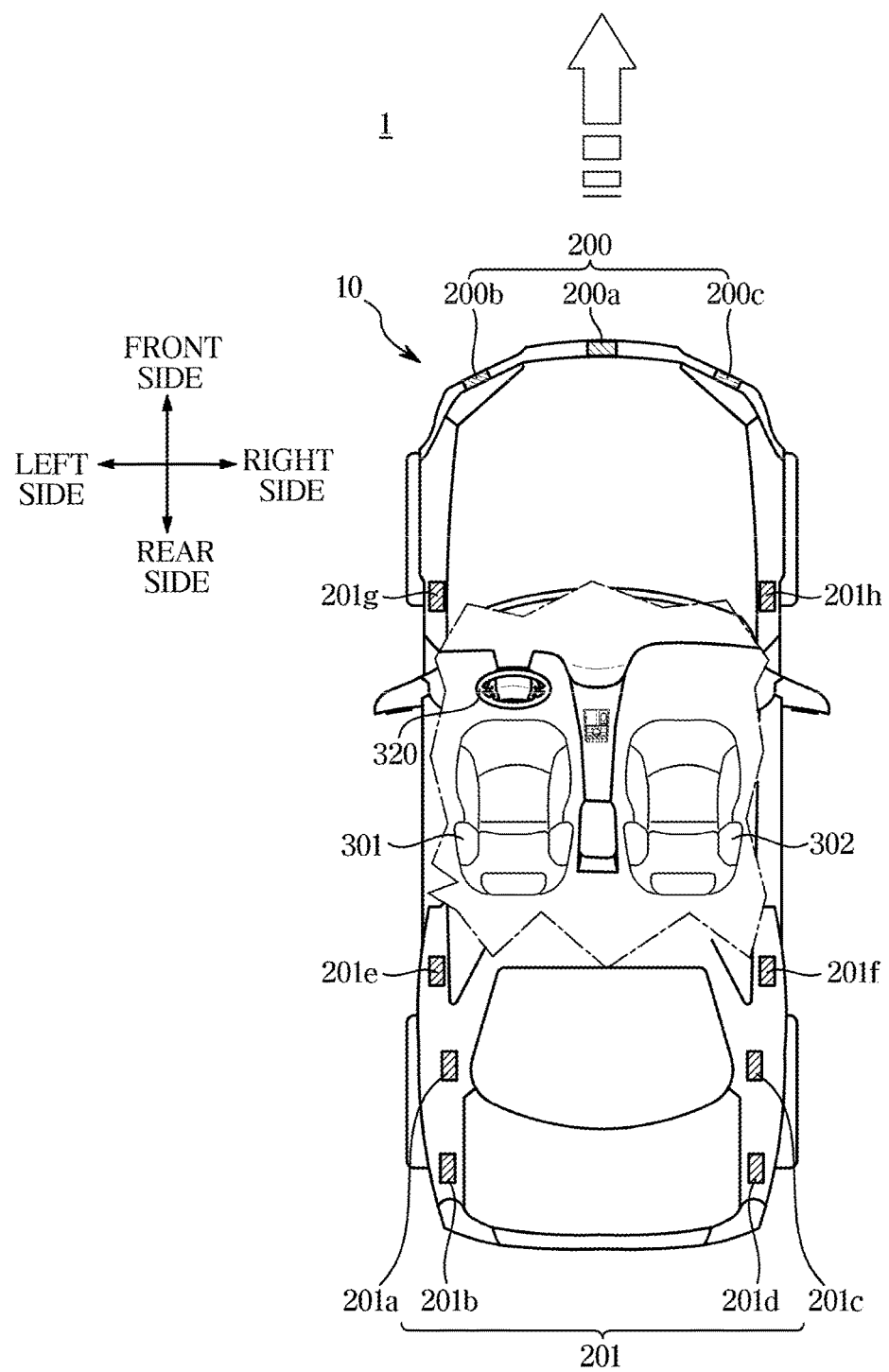
FIG. 2 illustrates a vehicle provided with a forward detection sensor and a side detection sensor according to a form.
Figure 3:
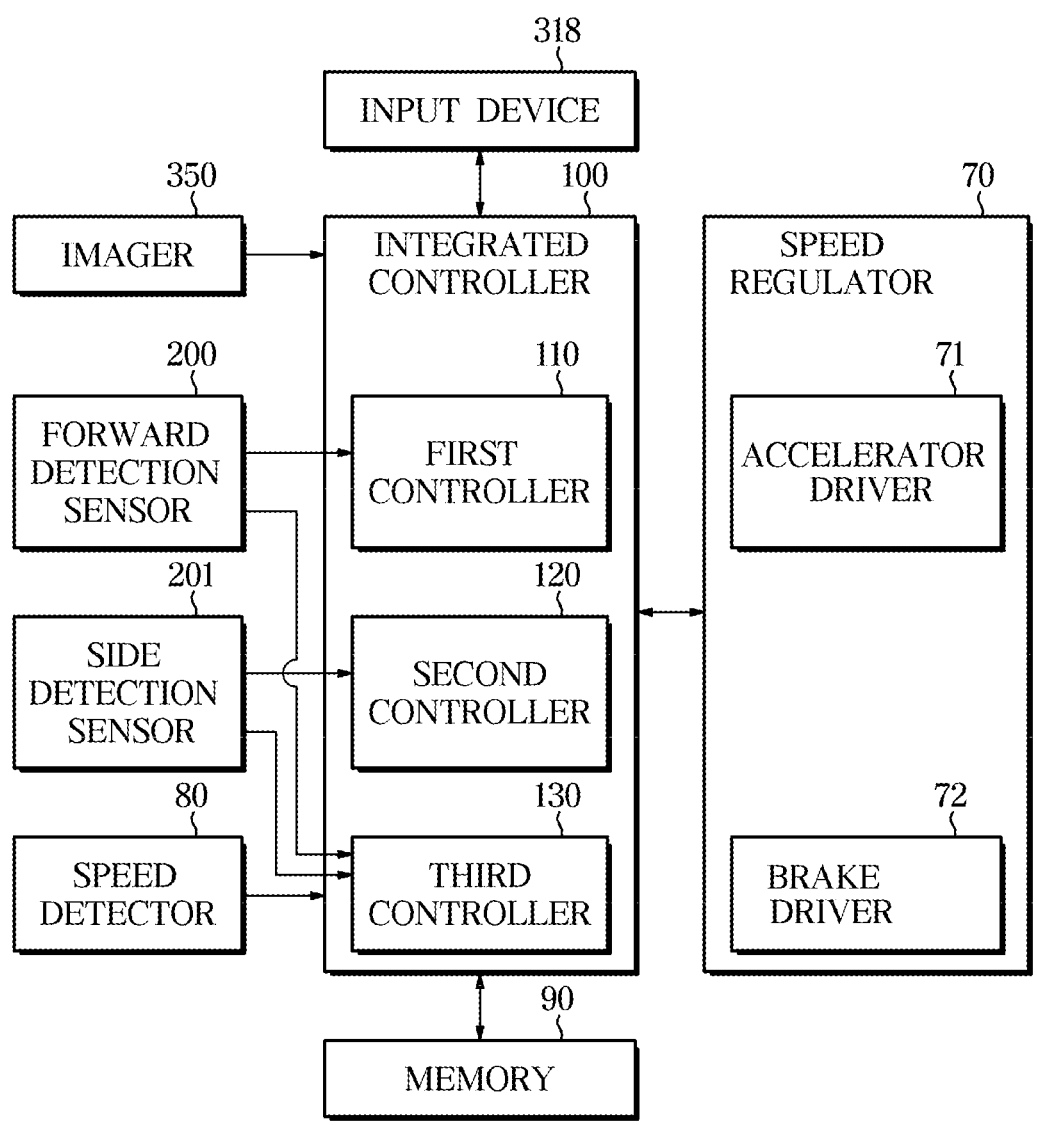
FIG. 3 is a control block diagram of a vehicle according to a form.
Figure 4A:
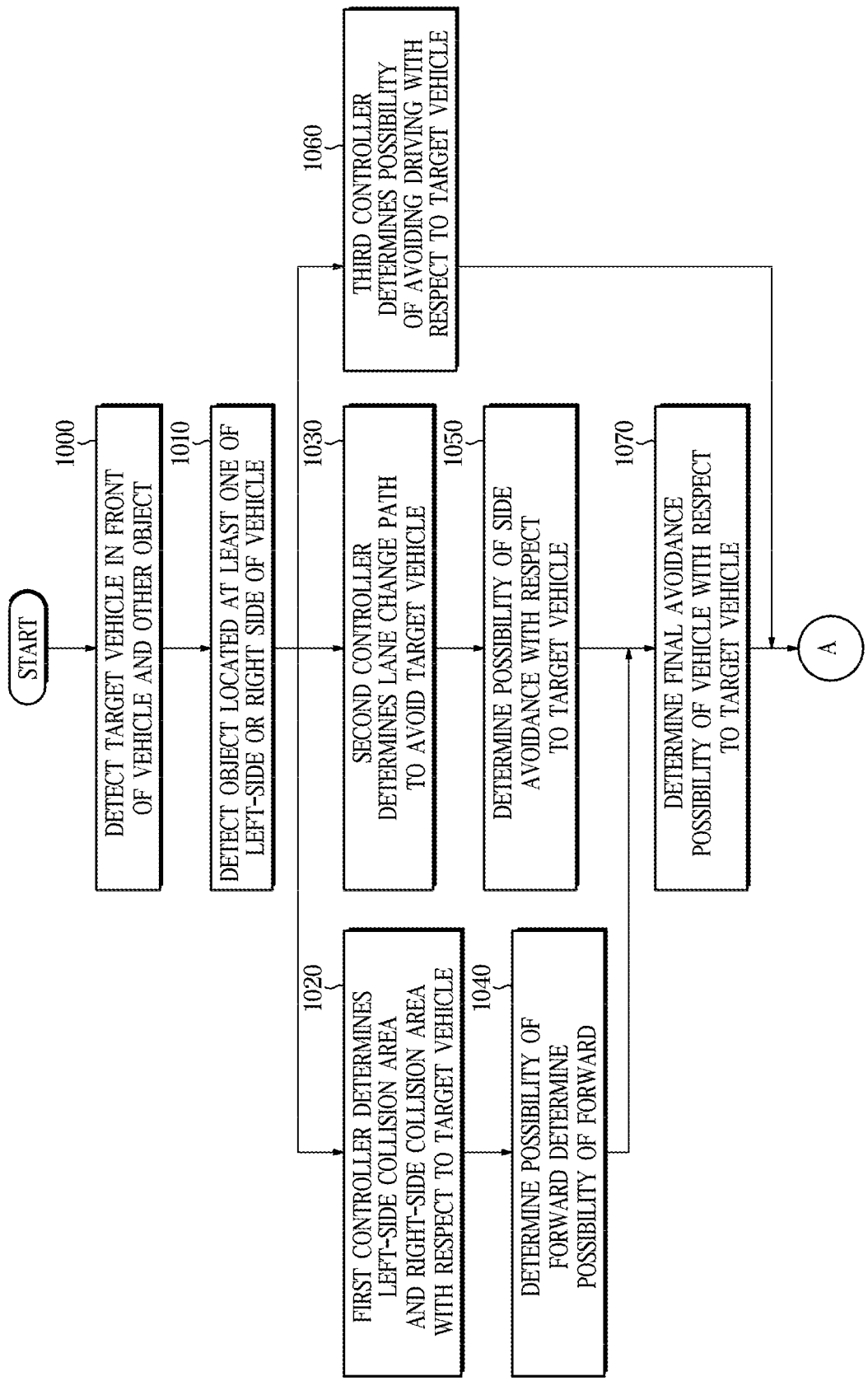
FIGS. 4A and 4B are flowcharts illustrating a control method of a vehicle according to a form.
Figure 4B:
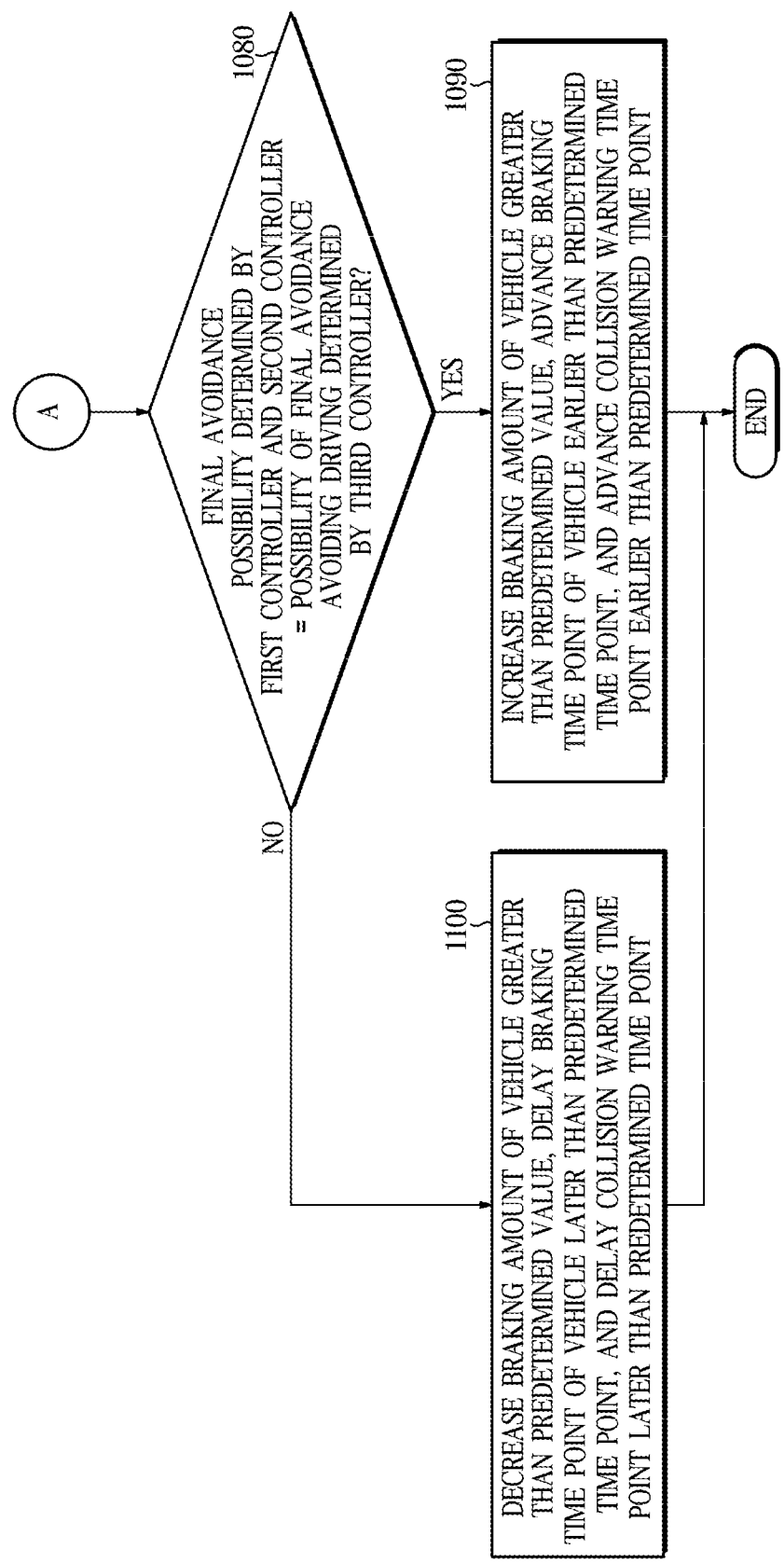
Figure 5:
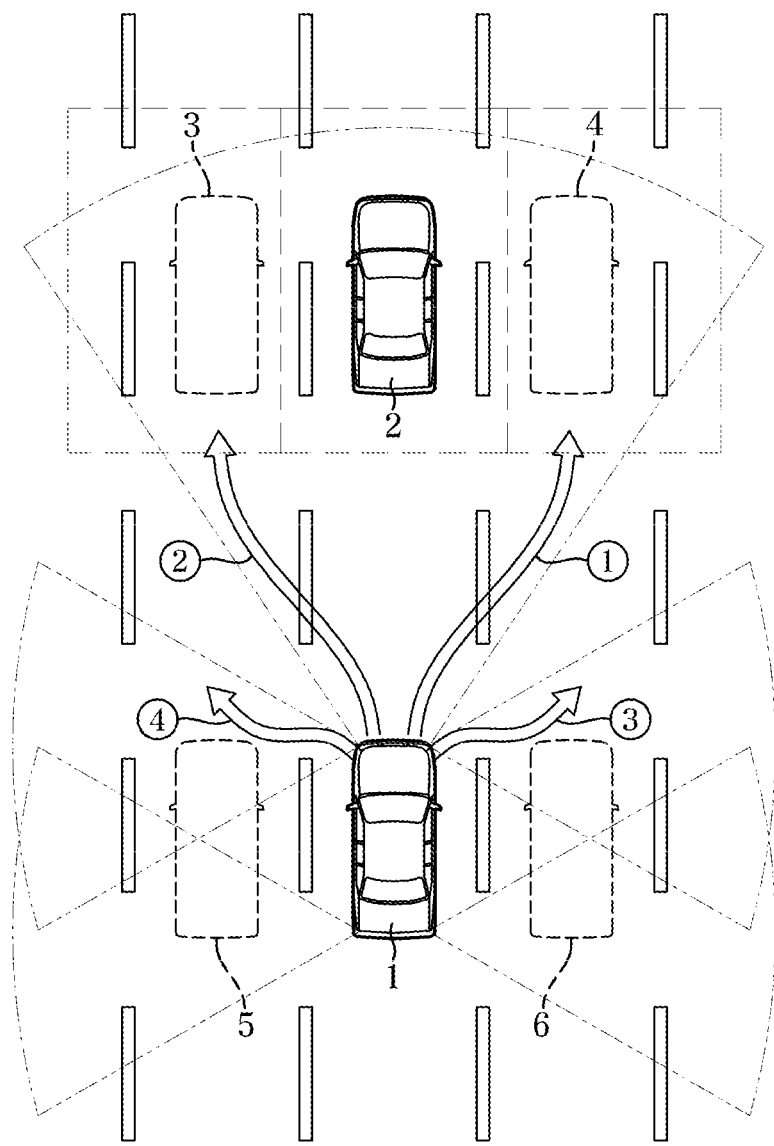
FIG. 5 is a conceptual diagram for collision avoidance control of a vehicle according to a form.

FIG. 2 illustrates a vehicle provided with a forward detection sensor and a side detection sensor according to a form, FIG. 3 is a control block diagram of a vehicle according to a form, FIGS. 4A and 4B are flowcharts illustrating a control method of a vehicle according to a form, FIG. 5 is a conceptual diagram for collision avoidance control of a vehicle according to a form, and FIG. 6 is a diagram illustrating a method for determining collision avoidance control of a vehicle according to a form.

Hereinafter for convenience of description, as illustrated in FIG. 1, a direction in which a vehicle moves forward may be defined as the front side, and the left direction and the right direction may be defined with respect to the front side. When the front side is a 12 o'clock direction, a 3 o'clock direction or its periphery may be defined as the right direction and a 9 o'clock direction or its periphery may be defined as the left direction. A direction opposite to the front side may be defined as the rear side. A bottom direction with respect to the vehicle 1 may be defined as the lower side and a direction opposite to the lower side may be defined as the upper side. A surface disposed in the front side may be defined as a front surface, a surface disposed in the rear side may be defined as a rear surface, and a surface disposed in the lateral side may be defined as a side surface. A side surface in the left direction may be defined as a left surface and a side surface in the right direction may be defined as a right surface.

Referring to FIG. 1, the vehicle 1 may include a body 10 forming an exterior of the vehicle 1, and a vehicle wheel 12 and 13 moving the vehicle 1.

The body 10 may include a hood 11a protecting a variety of devices, the parts including an engine, a roof panel 11b forming an inner space, a trunk lid 11c provided with a storage space, a front fender 11d and a quarter panel 11e provided on the side surface of the vehicle 1. In addition, a plurality of doors 14 hinge-coupled to the body 10 may be provided on the side surface of the body 10.

Between the hood 11a and the roof panel 11b, a front window 19a may be installed to provide a view of the front side of the vehicle 1, and between the roof panel 11b and the trunk lid 11c, a rear window 19b may be installed to provide a view of the rear side of the vehicle 1. In addition, on the upper side of the door 14, a side window 19*c* may be installed to provide a view of the lateral side.

On the front side of the vehicle 1, a headlamp 15 capable of emitting light in a driving direction of the vehicle 1 may be provided.

On the front and rear side of the vehicle 1, a turn signal lamp 16 indicating a driving direction of the vehicle 1 may be provided.

The vehicle 1 may indicate a driving direction by flashing the turn signal lamp 16. The turn signal lamp 16 may be installed on the front and rear side of the vehicle 1. On the rear side of the vehicle 1, a tail lamp 17 may be provided. The tail lamp 17 may be provided on the rear side of the vehicle 1 to indicate a gear shifting state and a brake operating state of the vehicle 1.

At least one imager 350 may be provided inside the vehicle 1. While the vehicle 1 drives or while the vehicle 1 is stopped, the imager 350 may acquire a surrounding image of the vehicle 1, detect an object in the vicinity of the vehicle 1, and acquire information related to the type of the object and the position information of the object. The object obtained in the vicinity of the vehicle 1 may include another vehicle, a pedestrian, and a bicycle, and may include a moving object or a stationary obstacle.

The imager 350 may image the object around the vehicle 1 and obtain the shape of the object by identifying the imaged object through the image recognition, and the imager 350 may transmit the obtained information to the controller 100.

FIG. 1 illustrates that the imager 350 is disposed around a room mirror 340, but is not limited thereto. Therefore, the imager 350 may be disposed in any position as long as capable of acquiring image information by imaging the inside or the outside of the vehicle 1.

The imager 350 may include at least one camera, and the imager 350 may include a three-dimensional space recognition sensor, a radar sensor, or an ultrasonic sensor to acquire a more accurate image. The three-dimensional space recognition sensor may include KINECT (RGB-D sensor), TOF (Structured Light Sensor), or stereo camera, but is not limited thereto. Therefore, the three-dimensional space recognition sensor may include other devices having the similar function as mentioned above.

Referring to FIGS. 1 and 2, a forward detection sensor 200 may be provided in the vehicle 1, wherein the forward detection sensor 200 is configured to identify an object in front of the vehicle 1 and acquire at least one piece of position information and driving speed information of the identified object.

The forward detection sensor 200 may obtain coordinate information, which is changed as the object moves, in real time, and identify a distance between the vehicle 1 and the object.

In addition, the forward detection sensor 200 may obtain the speed information of the object to move in front of the vehicle 1.

As mentioned above, the forward detection sensor 200 may calculate a relative distance and a relative speed between the vehicle 1 and the object based on the position and speed information of the object obtained by the forward detection sensor 200, and thus the forward detection sensor 200 may calculate a time to collision (TTC) between the vehicle 1 and the object based on the obtained relative distance and relative speed.

As illustrated in FIGS. 1 and 2, the forward detection sensor 200 may be installed in a position that is appropriate to recognize an object, e.g. another vehicle, in the front, lateral, or front lateral side. In one form, the forward detection sensor 200 may be installed in all of the front, the left and the right side of the vehicle 1 to recognize an object in all of the front side of the vehicle 1, a direction between the left side and the front side (hereinafter referred to as "front left side") of the vehicle 1 and a direction between the right side and the front side (hereinafter referred to as "front right side") of the vehicle 1.

For example, a first forward detection sensor 200*a* may be installed as a part of a radiator grill 6, e.g., inside of the radiator grill 6, or alternatively the first forward detection sensor 200*a* may be installed in any position of the vehicle 1 as long as identifying the other vehicle in the front side. A second forward detection sensor 200*b* may be installed in the left side of the vehicle 1, and a third forward detection sensor 200*c* may be installed in the right side of the vehicle 1.

In addition, a side detection sensor 201 may be provided that detects a pedestrian or another vehicle present in or approaching the rear, side, or rear side of the vehicle 1.

As illustrated in FIG. 2, the side detection sensor 201 may be installed in a position that is appropriate to recognize an object, e.g. another vehicle, in the lateral side, rear side or rear lateral side.

The side detection sensor 201 may be installed in both of the left and the right side of the vehicle 1 to recognize an object in all of a direction between the left side and the rear side (hereinafter referred to as "rear left side") of the vehicle 1 and a direction between the right side and the rear side (hereinafter referred to as "rear right side") of the vehicle 1. For example, a first side detection sensor 201*a* or a second side detection sensor 201*b* may be provided on the left surface of the vehicle 1, and a third side detection sensor 201*c* or a fourth side detection sensor 201*d* may be provided on the right surface of the vehicle 1.

In addition, the fifth side detection sensor 201*e* and the sixth side detection sensor 201*g* are provided on the left side of the vehicle 1, and the seventh side detection sensor 201*f* and the eighth side detection sensor 201*h* are provided on the right side of the vehicle 1.

In another form, the side detection sensor 201 may be installed in a plurality of positions to properly recognize a vehicle. For example, the first side detection sensor 201*a* and the second side detection sensor 201*b* may be installed in a left C pillar and a left rear fender of the vehicle 1, respectively and thus the first side detection sensor 201*a* and the second side detection sensor 201*b* may identify whether a pedestrian or other vehicle is present or whether a pedestrian or other vehicle is approaching. In the same manner, the third side detection sensor 201*c* and the fourth side detection sensor 201*d* may be installed in a right C pillar and a right rear fender of the vehicle 1, respectively and thus the third side detection sensor 201*c* and the fourth side detection sensor 201*d* may identify whether another vehicle is present. The position of the side detection sensor 201 is not limited thereto, and the side detection sensor 201 may be installed in any position of the vehicle 1 according to the selection of a designer. For example, the side detection sensor 201 may be installed in a position adjacent to the rear turn signal lamp.

The side detection sensor 201 may detect another vehicle driving in the rear side of the right side lane of a lane where the vehicle 1 is driving. For example, when the other vehicle drives in the right side lane of a lane where the vehicle 1 drives that is when the other vehicle is placed in the rear right side of the vehicle 1, the third side detection sensor 201c or the fourth side detection sensor 201d may detect the other vehicle driving in the rear right side of the vehicle 1. The third side detection sensor 201c or the fourth side detection sensor 201d may detect the other vehicle driving in the rear right side of the vehicle 1 and then obtain coordinate information and driving speed information of the other vehicle.

In the same manner, the side detection sensor 201 may detect another vehicle driving in the rear side of the left side lane of a lane where the vehicle 1 is driving. For example, when the other vehicle drives in the left side lane of a lane where the vehicle 1 drives that is when the other vehicle is placed in the rear left side of the vehicle 1, the first side detection sensor 201a or the second side detection sensor 201b may detect another vehicle driving in the rear left side of the vehicle 1. The first side detection sensor 201a or the second side detection sensor 201b may detect another vehicle driving in the rear left side of the vehicle 1 and then obtain coordinate information and driving speed information of the other vehicle.

The forward detection sensor 200 and the side detection sensor 201 may identify whether the other vehicle is present in or approaching from the left side, the right side, the front side, the rear side, the front left side, the front right side, the rear left side, or the rear right side, by using electromagnetic waves or laser light. For example, the forward detection sensor 200 and the side detection sensor 201 may emit electromagnetic waves, e.g., microwaves or millimeter waves, pulsed laser light, ultrasonic waves, or infrared light, to the left side, the right side, the front side, the rear side, the front left side, the front right side, the rear left side, or the rear right side, receive pulsed laser light, ultrasonic waves, or infrared light, which are reflected or scatted by an object in the direction, and identify whether the object is placed. The forward detection sensor 200 and the side detection sensor 201 may further identify a distance to the object or a speed of another vehicle in a driving state, by using a return time of the radiated electromagnetic waves, pulsed laser light, ultrasonic waves, or infrared light.

The forward detection sensor 200 and the side detection sensor 201 may be implemented by using a variety of devices, e.g., a radar using millimeter waves or microwaves, a Light Detection And Ranging (LiDAR) using pulsed laser light, a vision sensor using visible light, an infrared sensor using infrared light, or an ultrasonic sensor using ultrasonic waves. The forward detection sensor 200 and the side detection sensor 201 may be implemented by using any one of the radar, the Light Detection and Ranging (LiDAR), the vision sensor, the infrared sensor, or the ultrasonic sensor or by combining them. When a plurality of sensors 200 is provided in a single vehicle 1, each of the forward detection sensor 200 and the side detection sensor 201 may be implemented by using the same type of sensor or the different type of sensor. The implementation of the forward detection sensor 200 and the side detection sensor 201 is not limited thereto, and the forward detection sensor 200 may be implemented by using a variety of devices and a combination thereof which is considered by a designer.

In the interior of the vehicle, a display unit (not shown) may be installed. The display may provide various information in an image to a driver or a passenger of the vehicle 1. In addition, the display may provide a warning according to the degree of danger to a driver or a passenger. Specifically, when the vehicle 1 changes lanes, different warnings may be provided to the driver or the like depending on the degree of danger. The display may be implemented using a navigation device that is commonly used.

The center fascia may be installed at the center of the dashboard, and an input device 318 may be provided to input various commands related to the vehicle. The input device 318 may be implemented by using a physical button, a knob, a touch pad, a touch screen, a stick type manipulation device, or a track ball. The driver can control various operations of the vehicle 1 by operating the input device 318.

Referring to FIG. 3, the vehicle 1 according to an form includes a speed adjusting unit 70 for adjusting a driving speed of a vehicle 1 that a driver drives, and a speed detector 80 for detecting a driving speed of the vehicle 1, a memory 90 for storing data related to the control of the vehicle 1, and an integrated controller 100 for controlling each component of the vehicle 1 and controlling a traveling speed of the vehicle 1.

The speed adjusting unit 70 may adjust the speed of the vehicle 1 that the driver drives. The speed adjusting unit 70 may include an accelerator driver 71 and a brake driver 72.

The accelerator driver 71 receives the control signal of the integrated controller 100 to drive the accelerator to increase the speed of the vehicle 1, and the brake driver 72 receives the control signal of the controller 100 to reduce the speed of the vehicle 1 by activating the brake.

The integrated controller 100 may increase or decrease the distance between the vehicle 1 and another object based on a distance between the vehicle 1 and another object and a predetermined reference distance stored in the memory 90 to increase or decrease the running speed of the vehicle.

In addition, the integrated controller 100 may calculate the estimated time to collision between the vehicle 1 and the object based on the relative distance and the relative speed between the vehicle 1 and the object and based on the calculated estimated collision time, and may send the signal controlling the driving speed of the vehicle 1 to the speed adjusting unit 70.

The speed adjusting unit 70 can adjust the driving speed of the vehicle 1 under the control of the integrated controller 100, and when the risk of collision between the vehicle 1 and another object is high, the driving speed of the vehicle 1 may be reduced.

The speed detector 80 may detect the driving speed of the vehicle 1 driven by the driver under the control of the integrated controller 100. that is, the driving speed may be sensed using the speed at which the wheel of the vehicle 1 rotates. And the unit of travel speed can be expressed as [kph], and it can be expressed as the distance (km) traveled per unit time (h).

The memory 90 may store various data related to the control of the vehicle 1. in detail, information about a traveling speed, a traveling distance, and a traveling time of the vehicle 1 according to an exemplary form may be stored, and the type and location information of the object detected by the imager 350 may be stored.

In addition, the memory 90 may store position information and speed information of the object detected by the forward detection sensor 200 and the side detection sensor 201, and may store coordinate information that changes in real time of the moving object, information about the relative distance and the relative speed between the vehicle 1 and the object.

In addition, the memory 90 may store data related to a formula and a control algorithm for controlling the vehicle 1 according to an form, and the integrated controller 100 may transmit a control signal for controlling the vehicle 1 according to the equation and the control algorithm.

The memory 90 may be implemented as at least one of a nonvolatile memory device such as a cache, a read only memory (rom), a programmable rom (prom), an erasable programmable rom (eprom), an electrically erasable programmable rom (eeprom), and a flash memory, or volatile memory devices such as random access memory (ram), or a storage medium such as a hard disk drive (hdd) or cd-rom, but is not limited thereto. The memory 90 may be a memory implemented as a chip separate from the processor described above with respect to the integrated controller 100, or may be implemented as a single chip with the processor.

Referring to FIG. 1 to FIG. 3, an integrated controller 100 may be provided in the vehicle 1. the integrated controller 100 may perform electronic control on each component related to the operation of the vehicle 1.

As shown in FIG. 3, the integrated controller 100 may include a first controller 110, a second controller 120, and a third controller 130. in addition, the first control unit 110 to the third control unit 130 may not be included in the integrated controller 100 but may be implemented as a separate control device.

Hereinafter, a vehicle control method according to an exemplary form of the present disclosure will be described with reference to FIGS. 3 to 6.

The forward detection sensor 200 may detect the target vehicle 2 and other object located in front of the vehicle 1 (1000).

As shown in FIG. 5, the other object located in front of the driving vehicle 1 may be other vehicles 3 and 4 driving.

In addition, the side detection sensor 201 may detect an object located in at least one of the left side or the right side of the vehicle 1 (1010).

What the side detection sensor 201 senses, as shown in FIG. 5, may be other vehicles 5 and 6 driving in the left lane or the right lane of the driving vehicle 1. That is, it may be other vehicles 5, 6 running on the left or right side of the vehicle 1 or other vehicles 5, 6 approaching from the left rear side or the right rear side of the vehicle 1.

The first controller 110 determines a left-side avoidance area and a right-side avoidance area with respect to the target vehicle 2 detected in front of the vehicle 1 (1020). The possibility of forward avoidance of the vehicle 1 with respect to the target vehicle 2 may be determined by determining a avoidance path of the vehicle 1 as a left-side avoidance area or a right-side avoidance area (1040).

Specifically, the first controller 110 determines whether the object is located in the left-side avoidance area of the target vehicle 2 based on the front detection result of the vehicle 1 of the forward detection sensor 200. If the object is not located in the left-side avoidance area, the possibility of forward avoidance may be determined by the vehicle 1 avoiding the target vehicle 2 through the left-side avoidance path ②.

Also, the first controller 110 determines whether the object is located in the right-side avoidance area of the target vehicle 2 based on the front detection result of the vehicle 1 of the forward detection sensor 200. If the object is not located in the right-side avoidance area, the possibility of forward avoidance may be determined by the vehicle 1 avoiding the target vehicle 2 through the right-side avoidance path ①.

Referring to the table of FIG. 6, the first controller 110 determines whether other vehicles 3 and 4 are located in the right-side avoidance area and the left-side avoidance area of the target vehicle 2 based on the front detection result of the forward detection sensor 200. If other vehicles 3 and 4 are located in the right-side avoidance area and the left-side avoidance area, the possibility of forward avoidance may be determined as the vehicle 1 may not avoid the target vehicle 2.

As a result of the front sensing of the front sensing sensor 200, when the other vehicles 3 and 4 are not located in the right-side avoidance area and the left-side avoidance area of the target vehicle 2, the vehicle 1 can avoid the target vehicle 2 through the right-side avoidance path ① and the left-side avoidance path ②, in this case, as illustrated in FIG. 6, the first controller 110 may set a data flag for possibility of collision avoidance to "1".

In addition, when the other vehicle 3 is located in the left-side avoidance area and the other vehicle 4 is not located in the right-side avoidance area of the target vehicle 2 as a result of the front detection of the forward detection sensor 200, the vehicle 1 can avoid the target vehicle 2 through the right-side avoidance path ①, and in this case, as illustrated in FIG. 6, the first controller 110 may set a data flag for possibility of collision avoidance to "2".

In addition, if the other vehicle 4 is located in the right-side avoidance area of the target vehicle 2 and the other vehicle 3 is not located in the left-side avoidance area, as a result of the forward sensing of the forward detection sensor 200, the vehicle 1 can avoid the target vehicle 2 through the left-side avoidance path ②, and in this case, as illustrated in FIG. 6, the first controller 110 may set a data flag for possibility of collision avoidance to "3".

In addition, if the other vehicle 3, 4 is located in the right-side avoidance area and the left-side avoidance area of the target vehicle 2 as a result of the front detection of the forward detection sensor 200, the vehicle 1 cannot avoid the target vehicle 2 through both the right-side avoidance path ① and the left-side avoidance path ②, and in this case, as illustrated in FIG. 6, the first controller 110 may set a data flag for possibility of collision avoidance to "4".

As described above, the first controller 110 may set possibility of forward avoidance to be able to avoid collision with the target vehicle 2 through the avoidance path according to the front detection result of the vehicle 1 by the forward detection sensor 200.

Meanwhile, the second controller 120 determines a lane change path for the vehicle 1 to avoid the target vehicle 2 based on the object detected from the side of the vehicle 1 (1030), and determines the possibility of side avoidance of the vehicle 1 with respect to the target vehicle 2 based on the determined lane change path.

Specifically, the second controller 120 determines whether the object is located in the left side of the vehicle 1 based on the vehicle 1 side detection result of the side detection sensor 201, if the object is not located in the left side of the vehicle 1, and determines the possibility of side avoidance as the vehicle 1 avoids the target vehicle 2 through the left-side lane change path ④.

Also, the second controller 120 determines whether the object is located in the right side of the vehicle 1 based on the vehicle 1 side detection result of the side detection sensor 201 201, if the object is not located in the right side of the vehicle 1, and determines the possibility of side avoidance as the vehicle 1 avoids the target vehicle 2 through the right-side lane change path ③.

Referring to the table of FIG. 6, the second controller 120 determines whether other vehicles 5 and 6 are located in the right and left sides of the vehicle 1 based on the side detection result of the vehicle 1 of the side detection sensor 201, If the other vehicles 5, 6 are located in the right and left side of the vehicle 1, the second controller 120 determine the possibility of side avoidance as the vehicle 1 being unable to change lanes to avoid the target vehicle 2.

As a result of the side detection by the side detection sensor 201, when the other vehicles 5 and 6 are not located in the right and left sides of the vehicle 1, the vehicle 1 may perform lane change for avoiding the target vehicle 2 through the right lane change path ③ and the left lane change path ④, and in this case, as illustrated in FIG. 6, the second controller 120 may set a data flag for possibility of collision avoidance to "1".

In addition, as a result of the side detection by the side detection sensor 201, when the other vehicle 6 is not located in the right side of the vehicle 1 and the other vehicle 5 is located in the left side of the vehicle 1, the vehicle 1 may perform lane change for avoiding the target vehicle 2 through the right lane change path ③, and in this case, as illustrated in FIG. 6, the second controller 120 may set a data flag for possibility of collision avoidance to "2".

In addition, as a result of the side detection by the side detection sensor 201, when the other vehicle 6 is located in the right side of the vehicle 1 and the other vehicle 5 is not located in the left side of the vehicle 1, the vehicle 1 may perform lane change for avoiding the target vehicle 2 through the right lane change path ④, and in this case, as illustrated in FIG. 6, the second controller 120 may set a data flag for possibility of collision avoidance to "3".

In addition, as a result of the side detection of the vehicle 1 of the side detection sensor 201, when the other vehicles 5 and 6 are located in the right side and the left side of the vehicle 1, the vehicle 1 cannot perform lane change for avoiding the target vehicle 2 through both the right lane change path ③ and the left lane change path ④, and in this case, as illustrated in FIG. 6, the second controller 120 may set a data flag for possibility of collision avoidance to "4".

As described above, the second controller 120 may avoid collision with the target vehicle 2 by changing lanes according to the detection result of the right and left sides of the vehicle 1 by the side detection sensor 201. You can set the possibility of side avoidance.

In this way, the second controller 120 according to the detection results of the right and left sides of the vehicle 1 of the side detection sensor 201 can set the possibility of side avoidance that the vehicle 1 can avoid collision with the target vehicle 2 by changing lanes.

On the other hand, the third controller 130, based on the target vehicle 2 and the other object detection result of the forward detection sensor 200 and the side object detection result of the side detection sensor 201, may determine the possibility of avoiding collision of the vehicle 1 with the target vehicle 2(1060).

That is, the third controller 130 avoids collision with the target vehicle 2 in which located in front of the vehicle based on the sensing data transmitted from the forward detection sensor 200 and the side detection sensor 201, and determines the avoidance driving path to avoid the target vehicle 2 located in front of the vehicle, and determines the possibility of avoiding driving according to the determined path to avoid the target vehicle 2.

That is, the third controller 130 may include the target vehicle 2 located in front of the vehicle 1, the other vehicles 3 and 4, and the other vehicle 5 located in the left or right side of the vehicle 1, and calculate the estimated time to collision (TTC) with the vehicle 1 in consideration of the position, the distance between the vehicle, and the traveling speed, and determine a driving path for avoiding driving to the left or the right of the target vehicle 1, a lane change path of the vehicle 1, and the like In order to avoid the collision with the target vehicle 2.

The integrated controller 100 may determine a final avoidance possibility of the vehicle 1 with respect to the target vehicle 2 based on the possibility of forward avoidance determined by the first controller 110 and the possibility of side avoidance determined by the second controller 120 (1070).

That is, the integrated controller 100 determine possibility of avoidance whether the vehicle 1 can finally avoid the target vehicle 2 by combining the possibility of forward avoidance of the vehicle 1 with respect to the target vehicle determined by the first controller 110 itself and the possibility of side avoidance of the vehicle 1 with respect to the target vehicle determined by the second controller 120 itself.

Referring to the table of FIG. 6, the integrated controller 100 can set the final data flag for the possibility of collision avoidance of the vehicle 1 with respect to the target vehicle 2 by combining the data flag set by the first controller 110 and the data flag set by the second controller 120.

For example, when the data flag set by the first controller 110 is "1" and the data flag set by the second controller 110 is "1" to "3", the vehicle 1 may avoid the target vehicle 2 through the right-side avoidance path ① of the right-side avoidance area of the target vehicle 2 or the left-side avoidance path ② of the left-side avoidance area, or the vehicle 1 may avoid the target vehicle 2 through the right-side lane change path ③ in the right side of the vehicle 1 or the left-side lane change path ④ in the left side, and in this case, as shown in FIG. 6, the integrated controller 100 may set the final data flag for the possibility of collision avoidance to "0".

On the other hand, If the data flag set by the first controller 110 is "1", but the data flag set by the second controller 120 is "4", the vehicle 1 cannot change lane because of the other vehicle 5 in which located in the left-side of the vehicle 1 and the other vehicle 6 located in the right-side of the vehicle 1, as a result, avoidance driving to avoid the target vehicle 2 cannot be performed, and in this case, as shown in FIG. 6, the integrated controller 100 may set the final data flag for the possibility of collision avoidance to "1".

In addition, when the data flag set by the first controller 110 is "2" and the data flag set by the second controller 120 is "1" or "2", the vehicle 1 may avoid the target vehicle 2 through the right-side avoidance path ① of the right-side avoidance area of the target vehicle 2, or avoid the target vehicle 2 through the right lane change path ③ in the right side of the vehicle 1, and in this case, as shown in FIG. 6, the integrated controller 100 may set the final data flag for the possibility of collision avoidance to "0".

On the other hand, when the data flag set by the first controller 110 is "2", and the data flag set by the second controller 120 is "3" or "4", the vehicle 1 cannot change lane because of the other vehicle 6 located in the right-side of the vehicle 1, and therefore vehicle 1 cannot avoid the target vehicle 2 through the right-side avoidance path ① of the right-side avoidance area of the target vehicle 2, and in this case, as shown in FIG. 6, the integrated controller 100 may set the final data flag for the possibility of collision avoidance to "1".

In addition, when the data flag set by the first controller 110 is "3" and the data flag set by the second controller 120 is "1" or "3", the vehicle 1 may avoid the target vehicle 2 via the left-side avoidance path ② of the left-side avoidance area of the target vehicle 2, or through the left lane change path ④ in the left side of the vehicle 1, and in this case, as shown in FIG. 6, the integrated controller 100 may set the final data flag for the possibility of collision avoidance to "0".

On the other hand, when the data flag set by the first controller 110 is "3", and the data flag set by the second controller 120 is "2" or "4", the vehicle 1 cannot change lane because of the other vehicle 6 located in the left-side of the vehicle 1, and therefore vehicle 1 cannot avoid the target vehicle 2 through the left-side avoidance path ② of the left-side avoidance area of the target vehicle 2, and in this case, as shown in FIG. 6, the integrated controller 100 may set the final data flag for the possibility of collision avoidance to "1".

On the other hand, when the data flag set by the first controller 110 is "4", the vehicle 1 is located because the other vehicle 3 is located on the left side of the vehicle 1 and the other vehicle 4 is located on the right side of the vehicle 1, therefore the vehicle 1 cannot avoid the target vehicle 2 through the right-side avoidance path ① of the right-side avoidance area or the left-side avoidance path ② of the left-side avoidance area.

Therefore, in this case, since the vehicle 1 does not travel avoidably with respect to the target vehicle 2 regardless of whether the data flag set by the second controller 120 is "1" to "4", in this case, integrated controller 100, as shown in FIG. 6, may set the final data flag for the possibility of collision avoidance to "1".

If the final data flag set by the integrated controller 100 is "0", it is not desired to increase the control amount of collision avoidance such as the braking amount and the braking time of the vehicle 1, however, if the final data flag is "1", the control amount of collision avoidance, such as braking amount and braking timing point of the vehicle 1, should be increased to inhibit collision with the target vehicle 2.

The integrated controller 100 determines the final avoidance possibility of the target vehicle 2 of the vehicle 1 in the above-described manner, and compares the determined final avoidance possibility with the possibility of avoiding driving determined by the third controller 130 (1080).

The integrated controller 100 may increase the braking amount of the vehicle 1 greater than a predetermined value if the final avoidance possibility finally determined based on the possibility of forward avoidance of the vehicle 1 determined by the first controller 110 and the possibility of side avoidance determined by the second controller 120 is matched with the possibility of avoiding driving determined by the third controller 130 (1090).

In addition, in this case, the integrated controller 100 may advance the braking time point of the vehicle 1 earlier than the predetermined time point, and may advance the collision warning time of the vehicle 1 earlier than the predetermined time point (1090).

On the other hand, the integrated controller 100 may decrease the braking amount of the vehicle 1 less than a predetermined value if the final avoidance possibility finally determined based on the possibility of forward avoidance of the vehicle 1 determined by the first controller 110 and the possibility of side avoidance determined by the second controller 120 is not matched with the possibility of avoiding driving determined by the third controller 130 (1100).

In addition, in this case, the integrated controller 100 may delay the braking time point of the vehicle 1 later than the predetermined time point, and may delay the collision warning time of the vehicle 1 later than the predetermined time point (1100).

As described above, the third controller 130 may determine the possibility of avoiding driving of the vehicle 1 with respect to the target vehicle 2 independently of the first controller 110 and the second controller 120.

Conventionally, the third controller 130 control the braking amount, braking timing, collision warning timing, etc. Of the vehicle 1 based on the possibility of collision avoidance in consideration of the position, the distance between the vehicle, and the traveling speed with the other vehicles 5,6 which located in the left or right side of the vehicle, therefore, the reliability of the collision avoidance control system was low, and when some of the forward detection sensor 200 and the side detection sensor 201 failed or an error occurred in the processing result of one controller, a problem could occur in accurate collision avoidance control.

According to a vehicle and a control method thereof according to an form of the present disclosure, the integrated controller 100 integrates a probability of collision avoidance determined by each of the first controller 110 and the second controller 120 to determine a final avoidance possibility, and compares the final avoidance possibility determined by the integrated controller 100 with the possibility of avoiding driving determined by the third controller 130, and determines the control amount of collision avoidance of the vehicle 1 based on whether the data match.

Through this, the vehicle 1 processes forward collision determination and the side collision determination respectively by different controllers, and a plurality of controllers check each other to increase the reliability of the collision avoidance control system of the vehicle 1

On the other hand, the disclosed forms may be implemented in the form of a recording medium for storing instructions executable by a computer. Instructions may be stored in the form of program code and, when executed by a processor, may generate a program module to perform the operations of the disclosed forms. The recording medium may be implemented as a computer-readable recording medium.

The computer-readable recording medium includes all kinds of recording media in which instructions that can be decoded by a computer. For example, there may be read only memory (rom), random access memory (ram), a magnetic tape, a magnetic disk, a flash memory, an optical data storage device, and the like.

As described above, the disclosed forms have been described with reference to the accompanying drawings. Those skilled in the art will understand that the present disclosure can be implemented in a form different from the disclosed forms without changing the technical spirit or desired features of the present disclosure. The disclosed forms are exemplary and should not be construed as limiting.

The vehicle front collision determination and the vehicle side collision determination are respectively performed by different controllers, and mutual checks between the plurality of controllers have the effect of increasing the reliability of the collision avoidance control system of the vehicle.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirt and scope of the present disclosure.

DESCRIPTION OF SYMBOLS

1: vehicle
2: target vehicle

70: speed regulator
80: speed detector
90: memory
100: integrated controller
110: first controller
120: second controller
130: third controller
200: forward detection sensor
201: side detection sensor

What is claimed is:

1. A vehicle comprising:
a forward detection sensor configured to detect at least one of a target vehicle in front of the vehicle and/or a first object;
a side detection sensor configured to detect a second object located on at least one of a left-side or right-side of the vehicle;
a first controller configured to determine a possibility of forward avoidance of the vehicle with respect to the target vehicle;
a second controller configured to determine a possibility of side avoidance of the vehicle with respect to the target vehicle;
a third controller configured to determine a possibility of avoiding collision of the vehicle with the target vehicle based on a result of detecting the target vehicle and the first object of the forward detection sensor and a result of detecting the second object of the side detection sensor; and
an integrated controller configured to determine a final avoidance possibility for the target vehicle based on the possibility of forward avoidance determined by the first controller and the possibility of side avoidance determined by the second controller, and adjust a control amount of collision avoidance of the vehicle by comparing the possibility of avoiding driving determined by the third controller with the final avoidance possibility.

2. The vehicle according to claim 1, wherein
the first controller is configured to determine a left-side avoidance area and right-side avoidance area with respect to the detected target vehicle, and determines the possibility of forward avoidance of the vehicle with respect to the target vehicle based on the left-side or right-side avoidance area.

3. The vehicle according to claim 2, wherein the first controller is configured to:
determine an avoidance path for the vehicle to avoid in the left-side avoidance area or the right-side avoidance area, and
determine whether an object is located in the left-side avoidance area of the target vehicle based on a result of forward detecting of the forward detection sensor, and determine that the possibility of forward avoidance is that the vehicle avoids the target vehicle through the left avoidance path when the object is not located in the left-side avoidance area.

4. The vehicle according to claim 2, wherein the first controller is configured to:
determine an avoidance path for the vehicle to avoid in the left-side avoidance area or the right-side avoidance area,
determine whether an object is located in the right-side avoidance area of the target vehicle based on a result of forward detecting of the forward detection sensor, and
determine that the possibility of forward avoidance is that the vehicle avoids the target vehicle through the right avoidance path when the object is not located in the right-side avoidance area.

5. The vehicle according to claim 2, wherein the first controller is configured to:
determine whether the object is located in the right-side avoidance area and the left-side avoidance area of the target vehicle based on a result of forward detecting of the forward detection sensor, and
determine that the possibility of forward avoidance is that the vehicle cannot avoid the target vehicle if the object is located in the right-side avoidance area and the left-side avoidance area.

6. The vehicle according to claim 1, wherein the second controller is configured to:
determine a lane change path for the vehicle to avoid the target vehicle based on a detected object, and
determine the possibility of side avoidance of the vehicle with respect to the target vehicle based on the lane change path.

7. The vehicle according to claim 6, wherein the second controller is configured to:
determine whether an object is located in the left-side of the vehicle based on a result of side detecting of the side detection sensor, and
determine the possibility of side avoidance to avoid the target vehicle through the left lane change path when the object is not located in the left-side of the vehicle.

8. The vehicle according to claim 6, wherein the second controller is configured to:
determine whether an object is located in the right-side of the vehicle based on a result of side detecting of the side detection sensor, and
determine the possibility of side avoidance to avoid the target vehicle through the right lane change path when the object is not located in the right-side of the vehicle.

9. The vehicle according to claim 6, wherein the second controller is configured to:
determine whether an object is located in the right-side and left-side of the vehicle based on a result of side detecting of the side detection sensor, and
determine that the possibility of side avoidance is that the vehicle cannot avoid the target vehicle when the object is located in the right-side and the left-side of the vehicle.

10. The vehicle according to claim 1, wherein the integrated controller is configured to:
increase a braking amount of the vehicle to be greater than a predetermined value when the final avoidance possibility determined from the first controller and the second controller is matched to the possibility of avoiding driving determined by the third controller, and
decrease a braking amount of the vehicle to be less than the predetermined value when the final avoidance possibility determined from the first controller and the second controller is not matched to the possibility of avoiding driving determined by the third controller.

11. The vehicle according to claim 1, wherein the integrated controller is configured to:
advance a braking time point of the vehicle to be earlier than a predetermined time point when the final avoidance possibility determined from the first controller and the second controller is matched to the possibility of avoiding driving determined by the third controller, and
delay the braking time point of the vehicle to be later than the predetermined time point when the final avoidance possibility determined from the first controller and the second controller is not matched to the possibility of avoiding driving determined by the third controller.

12. The vehicle according to claim 1, wherein the integrated controller is configured to:
advance a collision warning time point of the vehicle to be earlier than a predetermined time point when the final avoidance possibility determined from the first controller and the second controller is matched to the possibility of avoiding driving determined by the third controller, and
delay the collision warning time point of the vehicle to be later than the predetermined time point when the final avoidance possibility determined from the first controller and the second controller is not matched to the possibility of avoiding driving determined by the third controller.

13. A method for controlling a vehicle including a first controller, second controller and a third controller, the method comprising:
detecting, by a forward detecting sensor, at least one of a target vehicle in front of the vehicle and/or other object;
detecting, by a side detecting sensor, an object located at least one of a left-side or right-side of the vehicle;
determining, by the first controller, a possibility of forward avoidance of the vehicle with respect to the target vehicle;
determining, by the second controller, a possibility of side avoidance of the vehicle with respect to the target vehicle;
determining, by the third controller, a possibility of avoiding driving of the vehicle with respect to the target vehicle based on a result of detecting the target vehicle and the other object and a result of detecting the object; and
determining, by an integrated controller, a final avoidance possibility for the target vehicle based on the possibility of forward avoidance determined by the first controller and the possibility of side avoidance determined by the second controller, and
adjusting, by the integrated controller, a control amount of collision avoidance of the vehicle by comparing the possibility of avoiding driving determined by the third controller with the final avoidance possibility.

14. The method according to claim 13, wherein
determining, by the first controller, the possibility of forward avoidance of the vehicle comprises determining a left-side avoidance area and a right-side avoidance area with respect to the detected target vehicle, and determining the possibility of forward avoidance of the vehicle with respect to the target vehicle based on the determined avoidance area by the first controller.

15. The method according to claim 14 further comprising:
determining, by the first controller, an avoidance path for the vehicle to avoid in the left-side avoidance area or the right-side avoidance area, and wherein
determining, by the first controller, the possibility of forward avoidance of the vehicle comprises determining whether an object is located in the left-side avoidance area of the target vehicle based on a result of forward detecting, and determining the possibility of forward avoidance as avoiding the target vehicle through the left avoidance path when the object is not located in the left-side avoidance area.

16. The method according to claim 14 further comprising:
determining, by the first controller, an avoidance path for the vehicle to avoid in the determined left-side avoidance area or the right-side avoidance area, and wherein
determining, by the first controller, a possibility of forward avoidance of the vehicle, comprising determining whether an object is located in the right-side avoidance area of the target vehicle based on a result of forward detecting, and determining the possibility of forward avoidance as avoiding the target vehicle through the determined right avoidance path when the object is not located in the right-side avoidance area, and
determining, by the third controller, whether the object is located in the right-side avoidance area and the left-side avoidance area of the target vehicle based on a result of forward detecting, and determining that the possibility of forward avoidance is that the vehicle cannot avoid the target vehicle if the object is located in the right-side avoidance area and the left-side avoidance area.

17. The method according to claim 13, wherein
determining, by the second controller, the possibility of side avoidance of the vehicle comprises determining a lane change path for the vehicle to avoid the target vehicle based on the detected object, and determining the possibility of side avoidance of the vehicle with respect to the target vehicle based on the determined lane change path by the second controller,
determining, by the third controller, whether the object is located in the left-side of the vehicle based on a result of side detecting of the side detection sensor, and determining the possibility of side avoidance to avoid the target vehicle through the determined left lane change path when the object is not located in the left-side of the vehicle,
determining, by the third controller, whether the object is located in the right-side of the vehicle based on a result of side detecting of the side detection sensor, and determining the possibility of side avoidance to avoid the target vehicle through the determined right lane change path when the object is not located in the right-side of the vehicle, and
determining, by the third controller, whether the object is located in the right-side and left-side of the vehicle based on a result of side detecting of the side detection sensor, and determining that the possibility of side avoidance is that the vehicle cannot avoid the target vehicle when the object is located in the right-side and the left-side of the vehicle.

18. The method according to claim 13 further comprising:
increasing a braking amount of the vehicle to be greater than a predetermined value if the final avoidance possibility determined from the first controller and the second controller is matched to the possibility of avoiding driving determined by the third controller, and
decreasing a braking amount of the vehicle to be less than the predetermined value if the final avoidance possibility determined from the first controller and the second controller is not matched to the possibility of avoiding driving determined by the third controller.

19. The method according to claim 13 further comprising:
advancing a braking time point of the vehicle to be earlier than a predetermined time point if the final avoidance possibility determined from the first controller and the second controller is matched to the possibility of avoiding driving determined by the third controller, and
delaying the braking time point of the vehicle to be later than the predetermined time point if the final avoidance possibility determined from the first controller and the second controller is not matched to the possibility of avoiding driving determined by the third controller.

20. The method according to claim 13 further comprising:

advancing a collision warning time point of the vehicle to be earlier than a predetermined time point if the final avoidance possibility determined from the first controller and the second controller is matched to the possibility of avoiding driving determined by the third controller, and delaying the collision warning time point of the vehicle to be later than the predetermined time point if the final avoidance possibility determined from the first controller and the second controller is not matched to the possibility of avoiding driving determined by the third controller.

* * * * *